United States Patent [19]
Piech et al.

[11] 3,779,223
[45] Dec. 18, 1973

[54] METHOD AND APPARATUS FOR MIXTURE PREPARATION OF INTERNAL COMBUSTION ENGINES

[75] Inventors: Ferdinand Piech, Stuttgart-Nord; Sepp Schmitt, Stuttgart-Ost, both of Germany

[73] Assignee: Dr.-Ing. h.c.F. Porsche KG, Stuttgart-Zuffenhausen, Germany

[22] Filed: Mar. 3, 1972

[21] Appl. No.: 231,622

[30] Foreign Application Priority Data
Mar. 5, 1971  Germany.................. P 21 10 484.7

[52] U.S. Cl............................................. 123/122 D
[51] Int. Cl........................................... F02m 31/04
[58] Field of Search .................... 123/122 B, 122 C, 123/122 D, 122 F, 123 R

[56] References Cited
UNITED STATES PATENTS

| | | |
|---|---|---|
| 3,450,119 | 6/1969 | Sendelbach.................. 123/122 D |
| 1,748,717 | 2/1930 | Kent............................... 123/122 F |
| 3,444,847 | 5/1969 | King............................... 123/122 D |
| 3,481,117 | 12/1969 | McKinlay.................... 123/122 D X |

*Primary Examiner*—Al Lawrence Smith
*Attorney*—Paul M. Craig et al.

[57] ABSTRACT

A method and apparatus for the mixture preparation of internal combustion engines in which an adaptation of the suction air temperature to the varying operating and load conditions of internal combustion engines for motor vehicles is achieved; possibly exclusively preheated air is thereby supplied to the internal combustion engine by way of the suction system in the partial load range while exclusively fresh air flows into the combustion engine in the full load range whereby the warm air serving for the mixture formation has a substantially constant temperature over the entire range of its admixture.

37 Claims, 3 Drawing Figures

METHOD AND APPARATUS FOR MIXTURE PREPARATION OF INTERNAL COMBUSTION ENGINES

The present invention relates to a method for the mixture preparation of internal combustion engines, especially for the adaptation of the suction air temperature to the changing operating and load conditions of internal combustion engines for motor vehicles, in which possibly exclusively preheated air flows to the combustion engine by way of the suction system in the partial load ranges whereas, in contrast thereto, exclusively fresh air flows to the internal combustion engine in the full load range.

With mixture-compressing internal combustion engines as well as with injection internal combustion engine an ignitable mixture formation takes place by the mixing of combustion air and fuel. For the purpose of complete and rapid combustion of the fuel under all occurring operating conditions, a good mixing of the fuel with the combustion air is necessary. This is realized by a mixture forming system which essentially depends on the temperature and/or the flow velocity of the sucked-in combustion air. However, the through-mixing deteriorates with decreasing air velocity and with cold combustion air so that with an excessively cold and with an excessively slowly flowing combustion air a sufficient mixing of the fuel with the combustion air does not take place. The flow velocity in the mixture forming system is dependent on the position of the output control member of the internal combustion engine, especially of the throttle valve, in such a manner that with a reduced flow cross section, i.e., in the partial load range of the internal combustion engine, a slight flow velocity exists and with fully opened flow cross section, i.e., in the full load range of the internal combustion, a large flow velocity exists. Simultaneously therewith, for an ignitable mixture formation also the temperature of the combustion air is of significance since a higher temperature thereof at a lower flow velocity prevents far-reachingly or completely the separation of fuel particles out of the mixture due to the further decreasing flow velocity downstream of the throttle cross section. In contradistinction thereto, with an adequate flow velocity, a higher temperature of the combustion air is undesirable because it would entail the so-called over-enrichment of the mixture due to the fuel supply corresponding to the flow velocity at lesser air density which leads to an incomplete combustion.

Different methods and installations are already known in the prior art for solving these problems. Thus, provision is made in the German Patent 810,557 that above a predetermined lower output range of the internal combustion engine, exclusively a throttle control takes place and above another upper output range a control of the temperature of the suction air takes place. Within the range of lower loads highly heated combustion air is thereby sucked in for achieving a complete mixing of the fuel at low flow velocities. With increasing flow velocity, i.e., with increasing load of the internal combustion engine, combustion air which increasingly becomes cooler is sucked in. During the transition from the partial load range into the full load range, the output control of the internal combustion engine is thereby to be realized by a change of the temperature of the suction air which leads to a delay in the reaction of the internal combustion engine to an adjustment of the output control lever since a sudden change of the temperature of the suction air is not possible. Such an output control is therefore less well suited for the driving engine of a motor vehicle since two streams of cold and heated up combustion air flowing alongside one another are supplied to the mixture forming device and a portion of the suction line is under cooled and the other portion is overheated which leads to an unsatisfactory mixture formation. According to the German patent 462,272 a change-over valve for the mixing of cold and preheated combustion air is provided which is arranged directly upstream of the mixture forming unit and is so coupled with the output control member, especially the throttle valve that the cold air proportion becomes greater in relation to the warm air proportion with an increasing load of the internal combustion engine, i.e., with increasing opening of the throttle valve. Though some of the disadvantages entailed by the aforementioned prior art method can be avoided, in this prior art construction a mixture of cold and preheated combustion air is always present in the lower partial load range so that at least with a cold internal combustion engine also a satisfactory mixture formation cannot take place.

Finally, a warm air admixture to the suction air is disclosed in the U.S. Pat. No. 3,459,163, which is controlled thermostatically by a bimetallic strip, whereby the opening and closing of a warm-air line terminating in the suction pipe connection is realized by means of a vacuum motor controlled by a bimetallic thermostat accommodated in the air filter, and more particularly in dependence on the temperature of the suction air entering the air filter. However, a more or less large warm-air admixture is provided thereby depending exclusively on the suction air temperature, which in its turn is controlled essentially independently of the output power requirement made of the internal combustion engine and therewith is effective both in the lower partial load range as also in the full load range disadvantageously on the mixture formation as well as on the legally prescribed value of the exhaust gas emission.

The aim of the present invention essentially consists in providing a method for the mixture preparation of internal combustion engines in which combustion air with a temperature optimum for the complete combustion is supplied to the internal combustion engine for each output range which can be controlled exclusively by the output control member, especially the throttle valve.

The underlying problem is solved according to the present invention in that the warm air serving for the mixture formation has a constant temperature over the entire range of its admixture which takes place appropriately by an admixture of fresh air to a warm air stream controlled as a function of the temperature, whose source heats up more rapidly than the internal combustion engine. The warm-air connection and disconnection takes place in a conventional manner in dependence on the position of the output control member of the internal combustion engine by means of a control asymmetric to the output control member in such a manner that exclusively warm air is supplied to the internal combustion engine in the lower partial load range and after a predetermined adjusting path of the output control member exclusively fresh air is supplied thereto. According to a preferred embodiment of the present invention, a mechanism is provided thereby in which a closure valve is pivotally arranged about a pivot axis disposed transversely to the flow direction in a suction channel or suction pipe connection provided with a radial warm air suction opening and with an axial fresh air suction opening and in which both the warm air suction opening as also the fresh air suction opening are disposed in the overlap or pivot range of the closure valve. For the preparation of a warm air with predetermined temperature, a radially arranged fresh-air inlet adapted to be closed by means of a control valve is connected into a warm-air line connected to the warm-air suction opening of the suction channel, whereby the control valve is pivotal about an axis arranged transversely to the flow direction and is arranged symmetrically to the warm-air-line cross section and cold-air inlet. A warm-air temperature which remains constant at all times is assured according to the present invention in that the control valve is controlled by a thermostatic operating element detecting the air temperature within the area of the warm-air suction opening. A mixing of warm air and cold air is assured by a mixing chamber connected directly upstream of the warm-air suction opening of the suction pipe connection, to which on the one hand, is connected the warm-air line and which, on the other, includes the fresh-air inlet and from which the prepared warm air leaves by way of a shaft slightly inclined with respect to the suction channel, in which is also arranged the thermostatic operating element for the adjustment of the control valve controlling the warm-air inlet. The closure valve arranged in the suction channel or suction pipe connection is controlled by means of a cam disk coupled by way of a linkage or the like with the output control member, especially with the throttle valve; the cam surfaces of the cam disk are of different configuration and an influence of the closure valve occurs only after exceeding a predetermined adjusting path of the output control member limiting the lower partial load range of the internal combustion engine while the closure valve is released upon exceeding the lower partial load range and simultaneously the warm-air suction opening is closed until finally with the beginning full load range the entire cross section of the suction channel is opened up and in exchange the warm-air suction opening is closed.

It is made possible by maintaining constant warm-air quantity over the entire warm-air admixture range to realize the output control of a mixture compressing internal combustion engine or of an injection internal combustion engine exclusively by way of the output control member thereof, especially the throttle valve thereof, and to supply nonetheless to the internal combustion engine a combustion air which is temperature-controlled in an optimum manner for the respective load condition so that the output of the internal combustion engine can be adjusted at any time at will and suddenly while a complete combustion is attained nonetheless also with a cold engine in every load range. The apparatus proposed for the realization of the method according to the present invention may be varied within wide limits, yet permits in the described construction a completely satisfactory realization of the method with slightest possible expenditures.

These and further objects, features and advantages of the present invention will become more apparent from the following description when taken in connection with the accompanying drawing which shows, for purposes of illustration only, one embodiment in accordance with the present invention and wherein.

Figure 1:
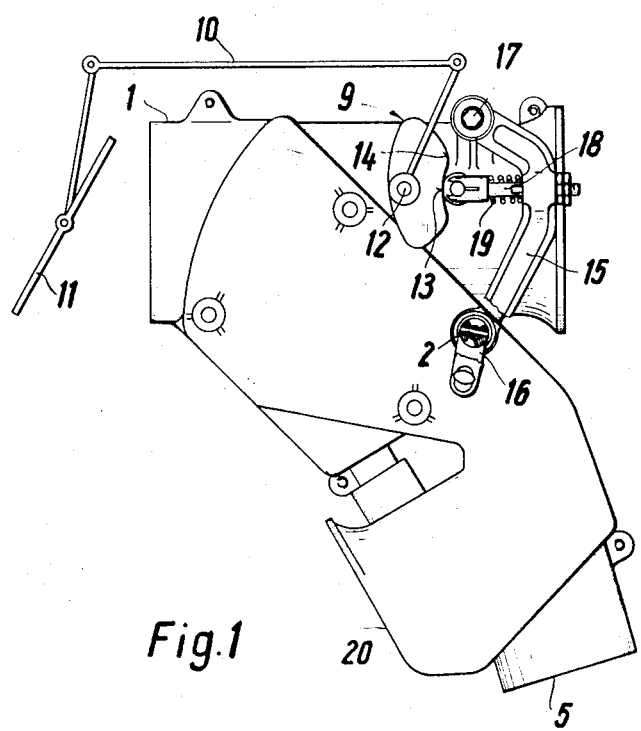
FIG. 1 is a side view of a suction pipe connection with a mixing chamber connected upstream thereof for producing warm air with a predetermined temperature for an internal combustion engine in accordance with the present invention.
Figure 2:
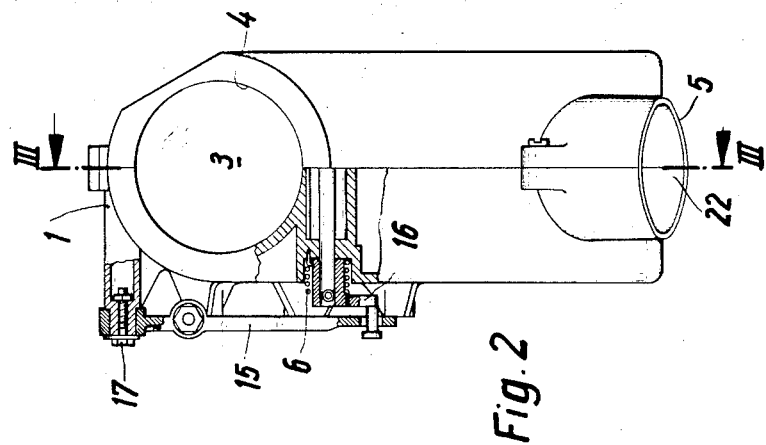
FIG. 2 is a front elevational view of FIG. 1.
Figure 3:
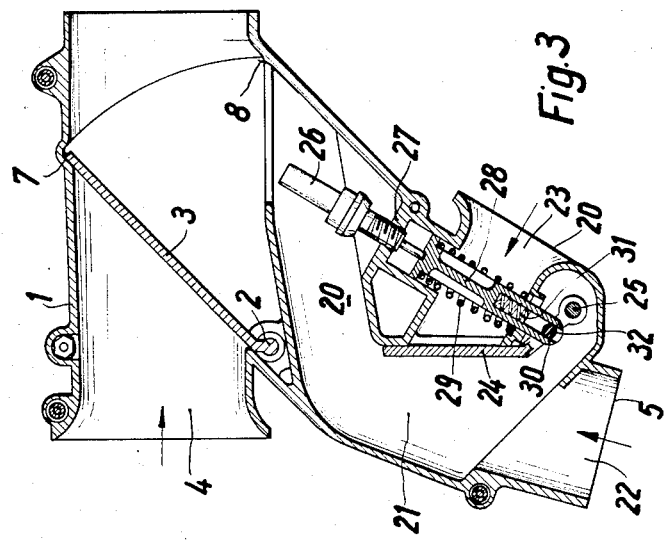
FIG. 3 is a cross-sectional view taken along line III—III of FIG. 2.

Referring now to the drawing wherein like reference numerals are used throughout the various views to designate like parts, a closure valve 3 (FIGS. 2 and 3) is pivotally supported about a pivot shaft 2 (FIGS. 1 and 3) directed transversely to the flow direction within the suction pipe connection 1 of the mixture forming system of an internal combustion engine not illustrated in detail. The suction pipe connection 1 is provided with an axial cold-air suction opening 4 (FIGS. 2 and 3) and a radial warm-air suction opening 5, between which the closure valve 3 is so arranged that the cold-air suction opening 4 and the warm-air suction opening 5 are adapted to be alternately closed. The closure valve 3 is held by means of a spiral spring 6 (FIG. 2) surrounding its shaft 2 and supported against the suction pipe connection 1, in its position closing the cold-air suction opening 4. The suction pipe connection 1 is further provided with two abutment surfaces 7 and 8 (FIG. 3) for the closure valve 3, of which the abutment surface 7 is coordinated to the cold-air closure position and the abutment surface 8 to the warm-air closure position. The closure valve 3 is adjusted by means of a cam disk generally designated by reference numeral 9 (FIG. 1) in dependence on the position of the output control member and against the force of the spring 6. The cam disk 9 is thereby coupled by way of a linkage 10 with the output control member, especially the throttle valve 11 of the internal combustion engine and is positively adjusted by the latter. The contact cam surface of the cam disk 9 includes, adjoining a section 13 concentric to its point of rotation 12, a steeply rising section 14, along which the closure valve 3 is adjusted in the opening direction more rapidly than the output control member 11. The movement of the cam disk 9 is transmitted to the shaft 2 of the closure 3 by means of a lever 15 which is connected by way of a crank-arm 16 with the shaft 2 and is supported at the suction pipe 1 by means of a pivot bearing 17. The detection of the cam disk movement takes place by way of a pin 18 which is supported by way of pressure springs 19 against the lever 15. The radial warm-air suction opening 5 of the suction pipe 1 is adjoined by a warm-air shaft 20 (FIGS. 1 and 3) arranged at an angle to the axis thereof, which connects a mixing chamber 21, to which are connected on the one hand, a hot-air line 22 (FIG. 3) and on the other, a cold-air inlet 23, with the suction pipe connection 1. The cold-air inlet 23 and the hot-air inlet 22 of the mixing chamber 21 are adapted to be closed by means of a control valve 24 which is pivotally arranged about a shaft 25 (FIG. 3) disposed transversely to the flow direction in the mixing chamber 21 and which is arranged symmetrically to the hot-air line cross section and cold-air inlet 23. The adjustment of the control valve 24 takes place by means of a thermostatic operating element 26 detecting the temperature of the warmair in the outlet of the warm-air shaft 20, which is supported with respect to the housing 27 of the mixing chamber 21 and acts on a transmission linkage 28 and adjusts the same against the force of a return spring 29. By means of a lower fork-shaped end 30, the transmission linkage 29 acts by means of a compression spring 31 on a pin 32 of the control valve 24. The pin 32 is arranged at a distance to the pivot axis 25 of the control valve 24. As can be seen in particular from the illustration of FIG. 3, the hot-air line 22 and the cold-air inlet 23 are connected to the mixing chamber 21 at an acute angle to each other whereby the control valve 24 is so angularly bent that both openings are adapted to be closed alternately.

OPERATION

The operation of the installation according to the present invention is as follows:

If the engine operates in the lower partial load range, the throttle valve 11 is opened only by a slight angular amount whereby the closure valve 3 in the suction pipe connection 1 remains in its position closing the cold-air suction opening 4 since the cam disk 9 coupled with the throttle valve 11 by way of the linkage 10 is adjusted only within its cam surface range 13 extending concentrically to its axis of rotation 12. In this position of the closure valve 3, the entire combustion air supply to the internal combustion engine takes place through the warm-air suction opening 5 so that exclusively preheated combustion air is supplied to the internal combustion engine. The preheating of the combustion air takes place in any known manner by way of a device which warms up more rapidly than the internal combustion engine, for example, electrically. In order to obtain a constant temmperature of the warm air in the warm-air shaft 20, the outlet temperature of the warm air from the mixing chamber 20 is detected by a thermostatic operating element 26 which upon exceeding the adjusted temperature more or less opens up the cold air inlet 23 of the mixing chamber 21 until the adjusted temperature is reached or maintained. If the output of the internal combustion engine determined by the position of the throttle valve 11 exceeds the lower partial load range, then as a result of the coupling between the throttle valve 11 and the closure valve 3, the cold-air suction opening 4 of the suction pipe connection 1 is more and more opened up and in addition to the warm air, a quantity of cold air is supplied to the internal combustion engine which increases with load. Since the contact cam surface 13 of the cam disk 9 controlling the closure valve movement is constructed concentrically to its axis of rotation 12, the closure valve 3 remains uninfluenced by the adjustment of the throttle valve up to an opening angle of the throttle valve 11 limiting the lower partial load range, for example, of 20° and is fully opened by way of the cam surface section 14 of the cam disk 9 during a further angular movement of the throttle valve 11 approximately between 20° and 50° opening angle, i.e., in the middle partial load range, whereby it finally closes the warm-air suction opening 5 within the area of the warm-air shaft 20 as soon as the cold-air suction opening 4 with beginning full load range is fully opened. With respect to the temperature of the combustion air, the following takes place; In the lower partial load range, corresponding to a throttle valve position up to 20° opening angle, the cold-air suction opening 4 of the suction pipe connection 1 remains fully closed, and preheated combustion air kept constant at a temperature of about 50° C is exclusively supplied to the internal combustion engine. With increasing opening of the throttle valve 11, the closure valve 3 is now increasingly opened within a range between 20° and 50° opening angle of the throttle valve 11, corresponding to a middle partial load range, in the sense of a release or opening of the cold-air suction opening 4 of the suction pipe connection 1 whereby the opening control of the closure valve 3 takes place more rapidly than the opening control of the throttle valve 11 and whereby further the closure valve 3 with a fully opened cold-air suction opening 4 simultaneously closes the warm-air suction opening 5. As a result thereof, with increasing opening control of the throttle valve 11 and therewith with increasing load a combustion air is supplied to the internal combustion engine which becomes increasingly cooler due to an additional cold air intake and finally, at the beginning of the full load range, exclusively cold combustion air is supplied to the internal combustion engine.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A method for the mixture preparation for internal combustion engines, especially for the adaptation of the suction air temperature to the changing operating and load conditions of internal combustion engines for motor vehicles in which preheated air is supplied to the internal combustion engine by way of a suction system in partial load ranges while exclusively fresh air flows into the combustion engine within the full load range, comprising the step of controlling the temperature of the warm air serving the mixture formation over the entire range of its admixture so as to have a substantially constant temperature.

2. A method according to claim 1, in which the control of the warm air preparation takes place by a temperature-dependent controlled admixture of fresh air to a warm air stream whose source heats up more rapidly than the internal combustion engine.

3. A method according to claim 2, further comprising the steps of effecting the warm air connection and disconnection in dependence on the adjustment of an output control member of the internal combustion engine with the use of a control asymmetric to the output control member and in which exclusively warm air is supplied to the internal combustion engine in the lower partial load range and after a predetermined adjusting path of the output control member exclusively fresh air is supplied thereto.

4. A method according to claim 1, further comprising the steps of effecting the warm air connection and disconnection in dependence on the adjustment of an output control member of the internal combustion engine with the use of a control asymmetric to the output control member and in which exclusively warm air is supplied to the internal combustion engine in the lower partial load range and after a predetermined adjusting path of the output control member exclusively fresh air is supplied thereto.

5. An installation for the mixture preparation for internal combustion engines to adapt the suction air temperature to the changing load and operating conditions of internal combustion engines for motor vehicles, in which preheated air is supplied to the internal combustion engine by way of the suction system in the partial load ranges while exclusively fresh air is supplied thereto in the full load range, characterized by a control system including control means controlling the temperature of the warm air serving for the mixture formation over the entire range of its admixture so as to have a substantially constant temperature.

6. An installation according to claim 5, characterized in that the warm-air preparation by temperature controlled admixture means of fresh air to a warm-air stream having a source that warms up more rapidly than the internal combustion engine.

7. An installation according to claim 5, characterized in that the warm-air connection and disconnection takes place in dependence on the adjustment of an output control member of the internal combustion engine with the use of a control means that is asymmetric to said output control member, said asymmetric control means being operable to supply to the combustion engine exclusively warm air in the lower partial load range and exclusively fresh air after a predetermined adjustment path of the output control member.

8. An installation according to claim 7, characterized by a suction pipe means provided with a substantially radial warm-air suction aperture and a substantially axial fresh-air suction aperture, closure valve means forming part of said control means and pivotally arranged in said suction pipe means about a pivot axis disposed substantially transversely to the flow direction, both the warm-air suction aperture as also the fresh-air suction aperture being arranged within the pivot range of the closure valve means.

9. An installation according to claim 8, characterized by a warm-air line connected to the warm-air suction aperture, a radially arranged fresh-air inlet being connected to the warm-air line, and control valve means operable to close said fresh air inlet.

10. An installation according to claim 9, characterized in that said control valve means is symmetrically mounted with respect to the fresh-air inlet and the warm-air line cross section.

11. An installation according to claim 10, characterized in that the control valve means is adjustable by a thermostatic operating element detecting the warm air temperature within the area of warm-air suction aperture.

12. An installation according to claim 11, characterized in that a mixing chamber means is connected upstream of the warm-air suction aperture by way of a warm-air shaft, the warm-air line, on the one hand, and the fresh-air inlet, on the other, being connected to said mixing chamber means at an acute angle to each other.

13. An installation according to claim 12, characterized by adjusting means for adjusting the closure valve means including a cam disk operatively connected with the output control member of the internal combustion engine, said cam disk having cam surfaces of differing configurations to provide an influencing of the closure valve means only upon exceeding a predetermined adjusting path of the output control member limiting the lower partial load range of the internal combustion engine, the closure valve means being released upon exceeding the lower partial load range and the warm-air suction aperture being simultaneously closed thereby.

14. An installation according to claim 7, characterized in that the warm-air preparation by temperature controlled admixture means of fresh air to a warm-air stream having a source that warms up more rapidly than the internal combustion engine.

15. An installation according to claim 5, characterized by a suction pipe means provided with a substantially radial warm-air suction aperture and a substantially axial fresh-air suction aperture, closure valve means forming part of said control means and pivotally arranged in said suction pipe means about a pivot axis disposed substantially transversely to the flow direction, both the warm-air suction aperture as also the fresh-air suction aperture being arranged within the pivot range of the closure valve means.

16. An installation according to claim 15, characterized by a warm-air line connected to the warm-air suction aperture, a radially arranged fresh-air inlet being connected to the warm-air line, and control valve means operable to close said fresh air inlet.

17. An installation according to claim 16, characterized in that said control valve means is symmetrically mounted with respect to the fresh-air inlet and the warm-air line cross section.

18. An installation according to claim 16, characterized in that the control valve means is adjustable by a thermostatic operating element detecting the warm air temperature within the area of warm-air suction aperture.

19. An installation according to claim 16, characterized in that a mixing chamber means is connected upstream of the warm-air suction aperture by way of a warm air shaft, the warm-air line, on the one hand, and the fresh-air inlet, on the other, being connected to said mixing chamber means at an acute angle to each other.

20. An installation according to claim 15, characterized by adjusting means for adjusting the closure valve means including a cam disk operatively connected with the output control member of the internal combustion engine, said cam disk having cam surfaces of differing configurations to provide an influencing of the closure valve means only upon exceeding a predetermined adjusting path of the output control member limiting the lower partial load range of the internal combustion engine, the closure valve means being released upon exceeding the lower partial load range and the warm-air suction aperture being simultaneously closed thereby.

21. A method of supplying combustion air to an internal combustion engine comprising:
providing air inlet line means leading directly to said engine,
providing a fresh air source upstream of said air inlet line means,
providing a preheated air source upstream of said air inlet line means separately from said fresh air source,
selectively controlling the supply of combustion air from said fresh air and preheated air sources to said air inlet line means in response to engine operating conditions such that preheated air from said preheated air source is supplied during partial engine load operations and such that only fresh air from said fresh air source is supplied during full engine load operations, and controlling the temperature of the preheated air supplied by said preheated air source so as to have a substantially constant temperature of said preheated air over at least those engine operating conditions during which said preheated air is supplied to said air inlet line means.

22. A method according to claim 21, wherein said step of controlling the temperature includes maintaining the temperature of the preheated air from said preheated air source as substantially constant for all engine operating conditions.

23. A method according to claim 21, wherein said step of selectively controlling the supply of combustion air includes controlling said supply such that only air from said preheated air source is supplied to said air inlet line means during certain partial engine load operations.

24. A method according to claim 21, wherein said step of controlling the temperature includes mixing a warm air stream with a fresh air stream in said preheated air source at a position upstream of said air inlet line means and separately from any mixing of air from said preheated air source with air from said fresh air source in said air inlet line means.

25. A method according to claim 24, wherein said step of controlling the temperature includes maintaining the temperature of the preheated air from said preheated air source as substantially constant for all engine operating conditions.

26. A method according to claim 25, wherein said step of selectively controlling the supply of combustion air includes controlling said supply such that only air from said preheated air source is supplied to said air inlet line means during certain partial engine load operations.

27. A method according to claim 22, wherein said step of controlling the supply of combustion air includes controlling a closure valve to selectively close said fresh air and preheated air source as a direct function of the position of an output control member for the engine.

28. An installation for supplying combustion air to an internal combustion engine comprising:
air inlet line means leading to said engine,
fresh air source means arranged upstream of said air inlet line means,
preheated air source means arranged upstream of said air inlet line means and separately from said fresh air source means,
combustion air supply control means for controlling the supply of combustion air from said fresh air and preheated air source means to said air inlet line means in response to engine operating conditions such that preheated air from said preheated air source means is supplied during partial engine load operations and such that only fresh air from said fresh air source is supplied during full engine load operations,
and preheated air temperature control means for maintaining the preheated air supplied by said preheated air source means at a substantially constant temperature at least during engine operating conditions when air is being supplied from said preheated source means to said air inlet line means.

29. An installation according to claim 28, wherein said temperature control means includes means for warming the air more rapidly than the internal combustion engine.

30. An installation according to claim 28, wherein said preheated air temperature control means includes means for mixing a warm air stream with a fresh air stream in said preheated air source means at a position upstream of air inlet line means and separately from any mixing of air from said preheated air source with air from said fresh air source in said air inlet line means.

31. An installation according to claim 30, wherein said preheated air temperature control means includes temperature control valve means for controlling said fresh air stream to said preheated air source means as a function of the temperature of the air in said preheated air source means at a position adjacent said air inlet line means.

32. An installation according to claim 28, wherein said combustion air supply control means includes a closure valve means which is pivotally arranged adjacent the upstream end of said air inlet line means for movement between positions selectively communicating said fresh air and preheated air source means with said upstream end, and wherein said closure valve means is movable between a first position with only air from said preheated air source means being communicated to said upstream end and a second position with only air from said fresh air source means being communicated to said upstream end.

33. An installation according to claim 31, wherein said combustion air supply control means includes a closure valve means which is pivotally arranged adjacent the upstream end of said air inlet line means for movement between positions selectively communicating said fresh air and preheated air source means with said upstream end, and wherein said closure valve means is movable between a first position with only air from said preheated air source means being communicated to said upstream end and a second position with only air from said fresh air source means being communicated to said upstream end.

34. An installation according to claim 32, characterized by adjusting means for adjusting the closure valve means including cam disk operatively connected with the output control member of the internal combustion engine, said cam disk having cam surfaces of differeing configurations to provide an influencing of the closure valve means only upon exceeding a predetermined adjusting path of the output control member limiting the lower partial load range of the internal combustion engine, the closure valve means being released upon exceeding the lower partial load range and the warm-air suction aperture being simultaneously closed thereby.

35. An installation according to claim 28, wherein said preheated air temperature control means includes means for maintaining a constant temperature of the air in said preheated air source means for all engine operating conditions.

36. An installation according to claim 34, wherein said preheated air temperature control means includes means for maintaining a constant temperature of the air in said preheated air source means for all engine operating conditions.

37. An installation according to claim 32, wherein said preheated air temperature control means includes means for maintaining a constant temperature of the air in said preheated air source means for all engine operating conditions.

* * * * *